United States Patent
Chass (12) 
(10) Patent No.: US 6,356,072 B1
(45) Date of Patent: Mar. 12, 2002

(54) HALL EFFECT SENSOR OF DISPLACEMENT OF MAGNETIC CORE

(76) Inventor: Jacob Chass, 70-25 Yellowstone Blvd., Forest Hills, NY (US) 11375

( * ) Notice: Subject to any disclaimer, the term of this patent is extended or adjusted under 35 U.S.C. 154(b) by 0 days.

(21) Appl. No.: 09/404,732

(22) Filed: Sep. 24, 1999

(51) Int. Cl.[7] .............................. G01B 7/14; G01R 33/07
(52) U.S. Cl. .............................. 324/207.2; 324/207.24; 324/207.26
(58) Field of Search ....................... 324/207.11, 207.18, 324/207.24, 207.2, 207.26; 340/686.4; 338/32 H (56) References Cited

U.S. PATENT DOCUMENTS 3,359,495 A * 12/1967 McMaster et al. ............ 324/40

* cited by examiner

*Primary Examiner*—Hezron Williams
*Assistant Examiner*—Henry S. Andersen
(74) *Attorney, Agent, or Firm*—Pitney, Hardin, Kipp & Szuch LLP (57) ABSTRACT

A sensor for measuring linear displacement has a core of magnetic material disposed for movement within a bobbin about which a coil of insulated, electrically conductive wire is wound. At least one Hall effect device is disposed about the coil. The sensor is contained with a magnetic housing. When the coil is excited by a DC power source, the direction of magnetic flux flowing through the Hall effect device is dependent upon the position of the core.

11 Claims, 10 Drawing Sheets

HALL EFFECT SENSOR OF DISPLACEMENT OF MAGNETIC CORE

BACKGROUND OF THE INVENTION

The present invention relates to linear displacement sensors and in particular to a Hall effect linear displacement sensor utilizing DC input power and providing a DC output. The sensor translates a variable linear core displacement to one or more DC outputs. Multiple output sensors find use as primary control elements in aircraft and other applications requiring one or more output signals. Heretofore the prevalent sensor for such applications consists of several linear variable differential transformers (LVDTs) assembled in parallel configuration.

Figure 1:
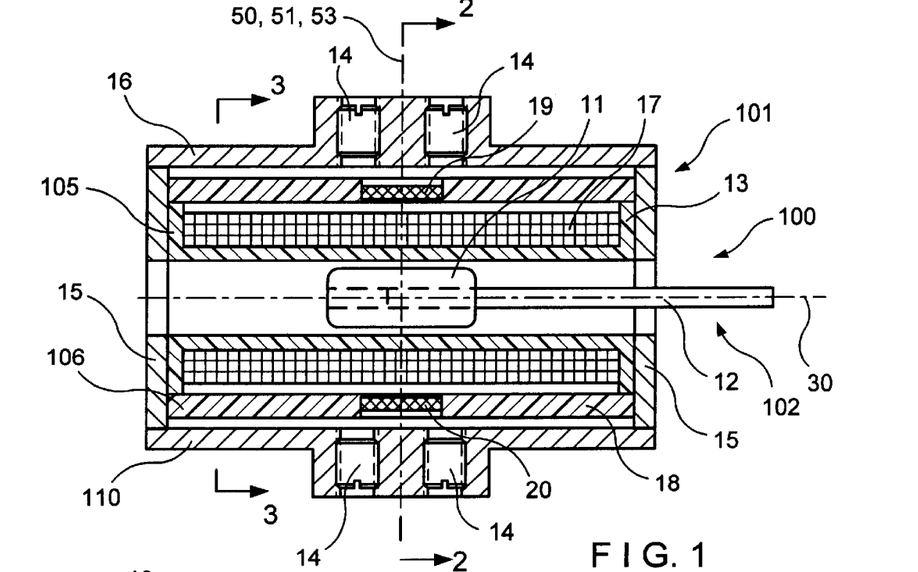
FIG. 1 is a schematic sectional view of a first embodiment of a displacement sensor in accordance with the present invention.

Such a system is shown in U.S. Pat. No. 4,807,516 to Imre Takats. This patent discloses an aircraft flight control system employing three controllers operating as dual actuators. FIG. 1 of Takats depicts two dual LVDT assemblies which are AC devices requiring an AC power source for input power excitation and requiring a demodulator for output voltage measurement. Each of the LVDTs requires a separate core-rod assembly and parallel core-rod assemblies are attached to a yoke containing a ball bearing assembly for attachment to a single rod. Many aircraft control systems include dual triple or quadruple LVDT systems.

The prior art also includes a lateral displacement of a permanent magnet inducing a flux flow through a Hall effect device which in turn generates an output voltage indicative of the position of the permanent magnet with respect to the Hall effect device. Such arrangements are generally taught in U.S. Pat. Nos. 4,319,236; 4,107,604 and 4,322,709. The later reference relies on a magnetic circuit having a variable air gap with an increasing flux density used to activate a switch.

SUMMARY OF THE INVENTION

It is the object of the present invention to provide a displacement sensor which eliminates the need for the AC power supply, demodulator and elaborate mechanical rod assembly required of the prior art.

A farther object is to provide such a sensor which has a DC input and provides a DC output and one in which a single rod may be used to provide more than one output voltage.

A still further object is to provide a sensor that is not susceptible to external demagnetization of its magnetic element by utilizing a core made of a soft iron magnetic material rather than a permanent magnet.

Still another object is to provide a core position sensor whose output voltage magnitude and polarity may be adjusted over its displacement range by varying the coil excitation voltage, whose design is relatively simple, small in size and inexpensive to produce.

The above objects and advantages are attained in accordance with the present invention by providing a Hall effect magnetic core displacement sensor comprised of an electrical sensing assembly and a core rod assembly contained within a housing of magnetic material. The electrical sensing assembly consists of a bobbin of non-magnetic material about which a coil of electrically conductive, insulated wire is wound and a Hall effect device disposed about the coil. The Hall effect device is positioned about a line of symmetry of the bobbin/coil assembly. The core consists of a soft magnetic material in the form of a cylinder that is attached to a cylindrical rod made of a non-magnetic material.

DETAILED DESCRIPTION OF THE PREFERRED EMBODIMENTS

Figures 2, 3:
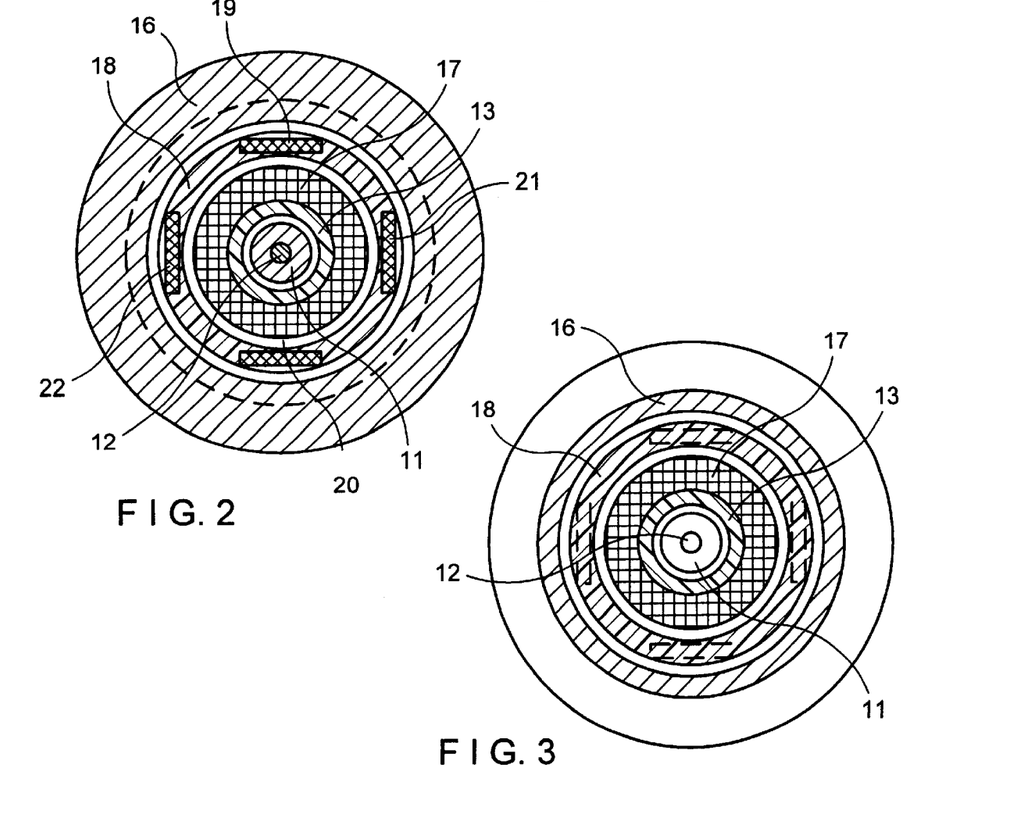
FIG. 2 is a sectional view taken along lines 2—2 of FIG. 1.
FIG. 3 is a sectional view taken along lines 3—3 of FIG. 1.
Figures 4, 5:
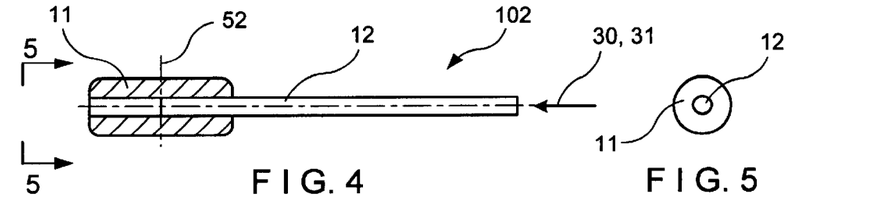
FIG. 4 is a schematic sectional view of a core-rod assembly of the displacement sensor.
FIG. 5 is a front end view of the core-rod of FIG. 4.
Figure 6:
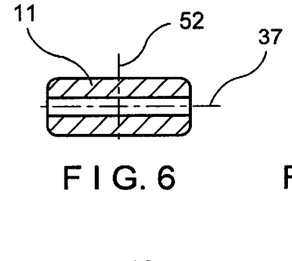
FIG. 6 is a schematic sectional view of the core.
Figures 7, 8:
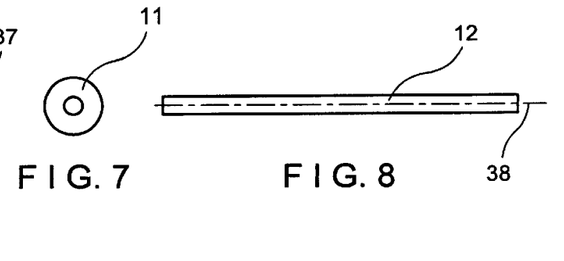
FIG. 7 is a front end view of the core.
FIG. 8 is a side view of the rod.

Reference is now made to the drawings and to FIGS. 1–3 in particular wherein a linear displacement sensing device 100 is depicted which translates a displacement of a core into a DC output. The sensor 100 consists of an electrical sensing assembly 101 and a core-rod assembly 102 (shown in detail in FIGS. 4–8).

Figure 13:
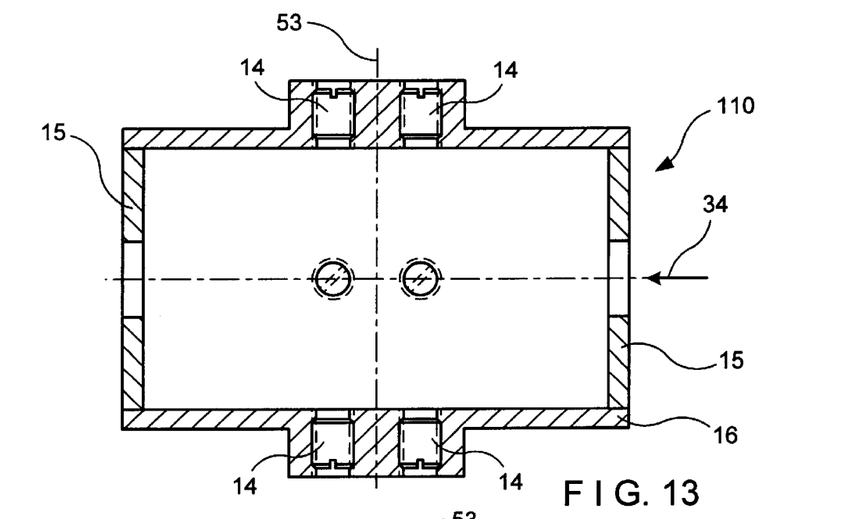
FIG. 13 is a side sectional view of the displacement sensor housing.
Figures 14, 15:
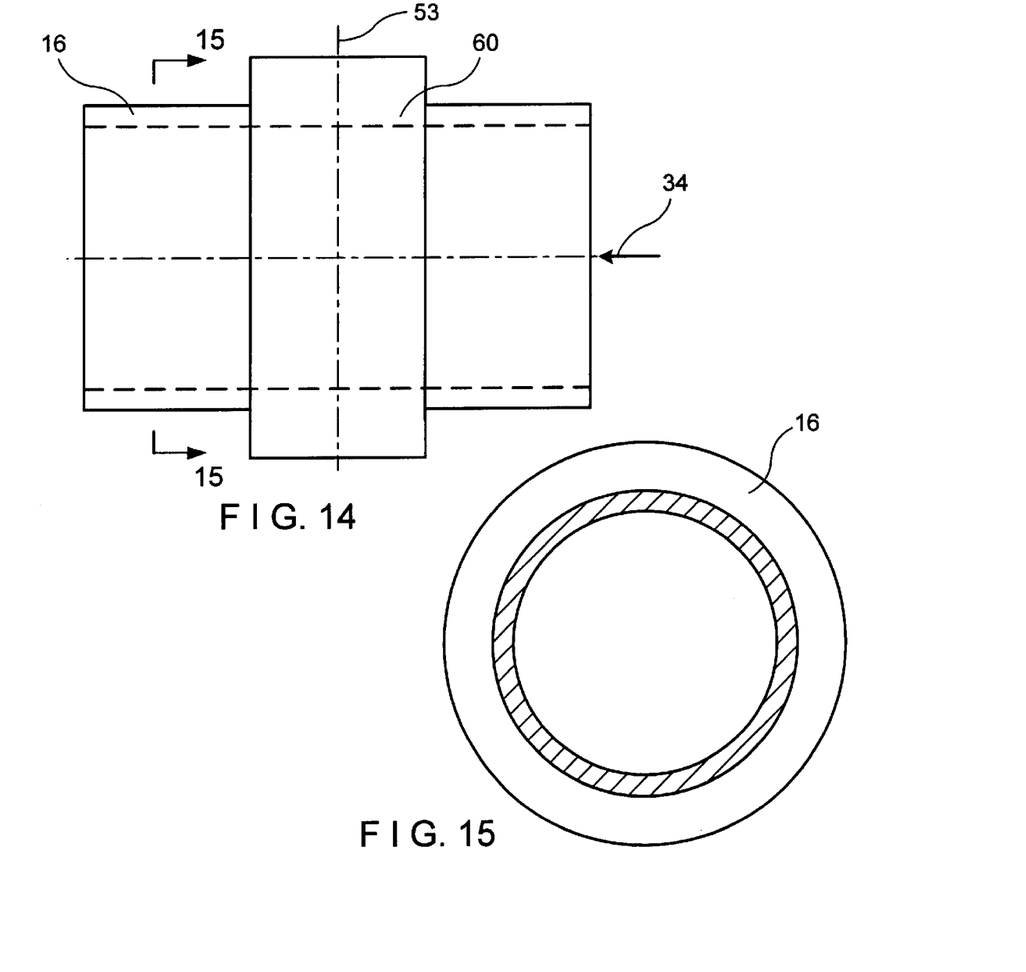
FIG. 14 is a side view of the displacement sensor housing.
FIG. 15 is a sectional view taken along reference lines 15—15 of FIG. 14.

The electrical sensing assembly 101 consists of a hollow bobbin-coil assembly 105 (the components of which are shown in detail in FIGS. 9–12) and a Hall effect device holder assembly 106 (shown in detail in FIGS. 18–21) contained within a magnetic shell assembly 110 (shown in detail in FIGS. 13–15).

Figure 9:
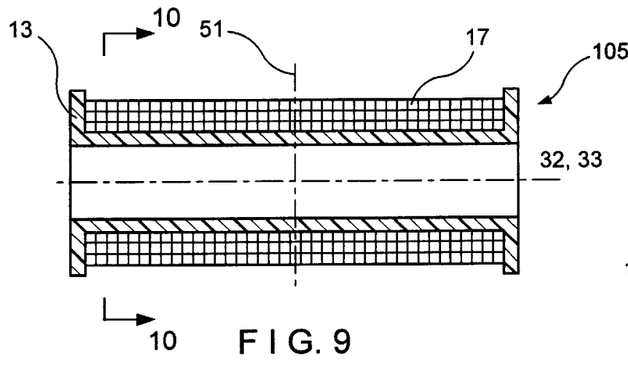
FIG. 9 is a schematic sectional view of the electrical coil assembly.
Figure 10:
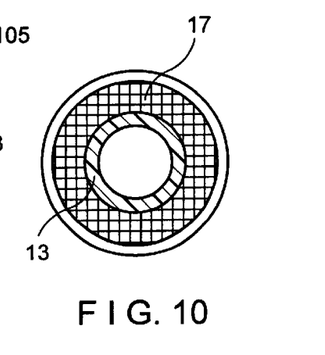
FIG. 10 is a front end view of the electrical coil.
Figure 11:
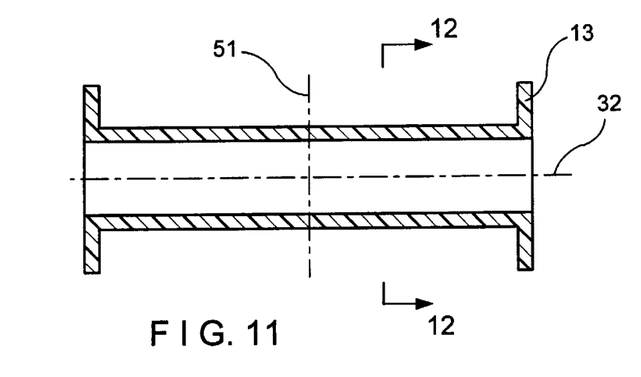
FIG. 11 is a side view in section, of the bobbin.
Figure 12:
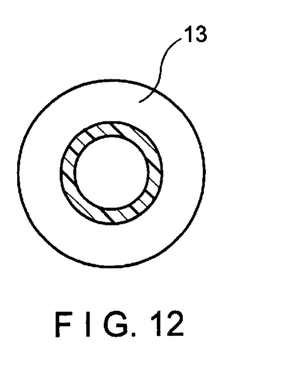
FIG. 12 is the bobbin; front view in section; along reference lines 12—12 of FIG. 11.

The bobbin-coil assembly 105 is made up of a cylindrical hollow bobbin 13 about which is wound a coil 17 of insulated electrically conductive wire so that the bobbin axis 32 and coil axis 33 substantially coincide as may be seen FIGS. 9 and 10. It should be appreciated that the winding density along the coil axis 33 need not be uniform.

Figure 16:
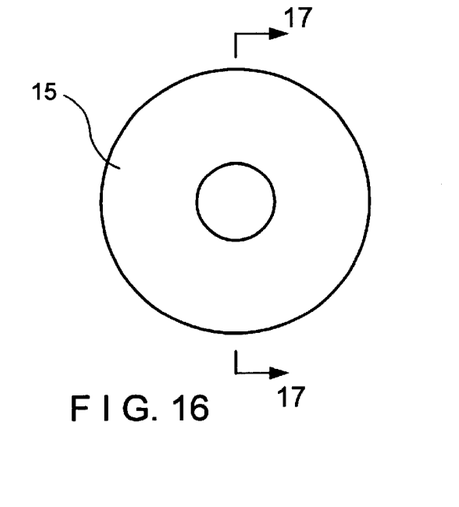
FIG. 16 is an end view of the magnetic washers of the displacement sensor housing.
Figure 17:
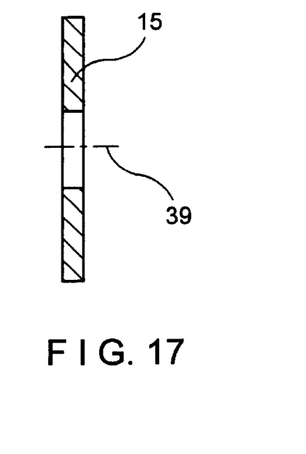
FIG. 17 is a sectional view taken along lines 17—17 of FIG. 16.
Figures 18, 19:
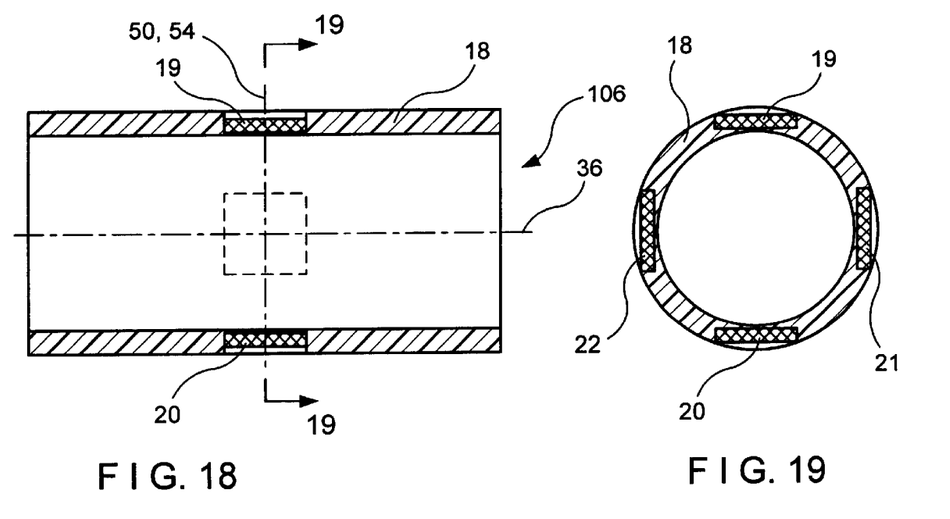
FIG. 18 is a side sectional view of a Hall effect device assembly consisting of four Hall effect devices and a holder.
FIG. 19 is a sectional view taken along line 19—19 of FIG. 18.
Figures 40, 41, 42, 43, 44, 45:
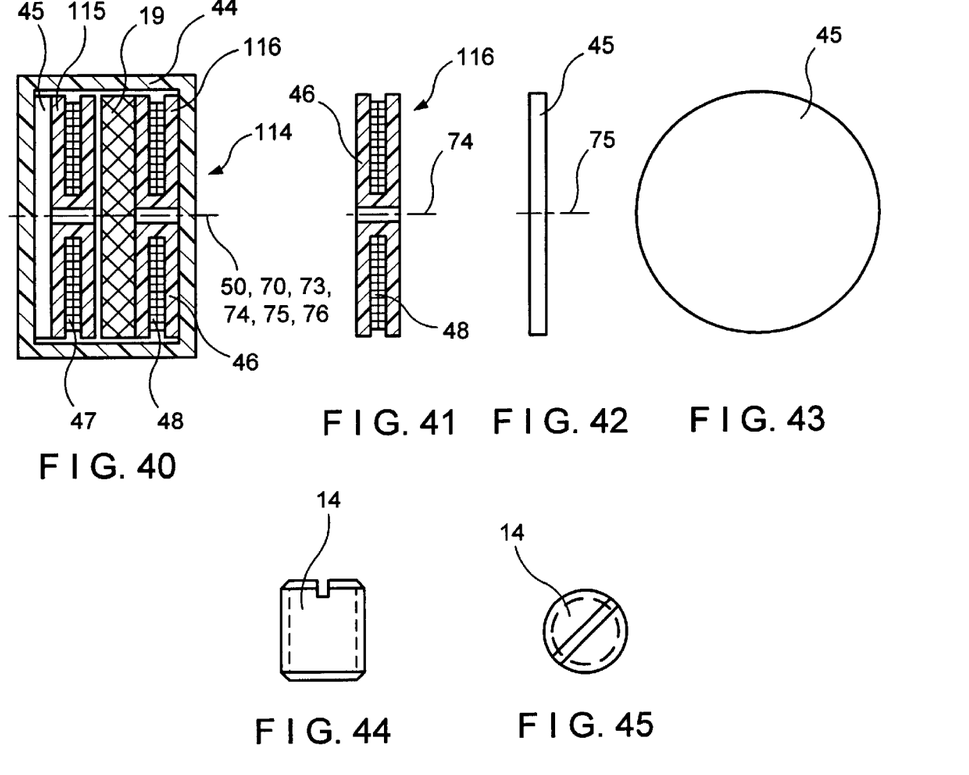
FIG. 40 is a schematic side sectional view of a second compound proximity sensor.
FIG. 41 is a side view of the bobbin/coil assembly of the sensor of FIG. 40.
FIG. 42 is a side view of the magnetic disk of the sensor of FIG. 40.
FIG. 43 is a plan view of the magnetic disk.
FIG. 44 is a side view of a magnetic adjusting screw.
FIG. 45 is a plan view of the adjusting screw of FIG. 44.

Reference is now made to FIGS. 13–15 in which the housing assembly 110 is depicted. The housing assembly 110 consists of a cylindrical shell 16. A thickened section extends about the middle of the cylindrical shell 16 and eight screws 14 extend into threaded openings in the thickened section. The screws 14 (shown in FIGS. 44 and 45) are arranged in sets of two, set 90° apart, about the thickened section of the cylindrical shell 16. The ends of the cylindrical shell are closed by washers 15 (depicted in FIGS. 16 and 17). The cylindrical housing 16, washers 15 and screws 14 are all formed of magnetic material. The openings of washers 15 fall on axis 39, which, when assembled in to the ends of the cylindrical shell 16, coincides with the axis 34 of he cylindrical shell.

Figure 20:
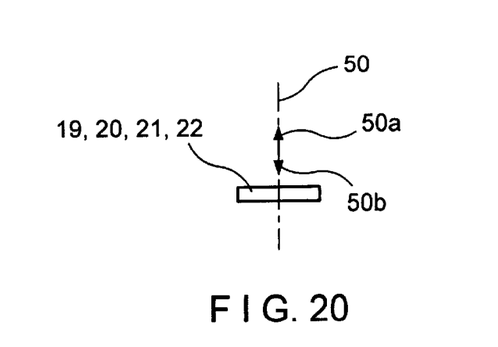
FIG. 20 is a side view of a Hall effect device.
Figure 21:
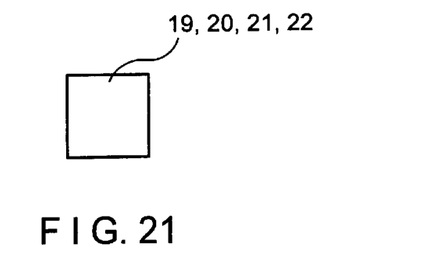
FIG. 21 is atop view of the Hall effect device.

The Hall effect device holder assembly 106 (shown in FIGS. 18 and 19) comprises a cylindrical holder 18 having four rectangular cutouts set 90° apart extending about its middle into which Hall effect devices 19, 20, 21 and 22 are fitted. The Hall effect devices 19, 20, 21, 22 have the same rectangular shape depicted in FIGS. 20 and 21 so that when the Hall effect devices are positioned in holder 18, the lateral axis of symmetry 50 of each of the devices falls on the same plane 54 (which extends into and out of the paper in FIG. 18). The plane 54 is perpendicular to the axis 36 of the cylindrical holder 18. As shown in FIG. 20, each of the Hall effect devices has a positive direction of magnetic sensitivity 50a and a negative direction of magnetic sensitivity 50b along the lateral axis of magnetic sensitivity 50.

The core-rod assembly 102 is shown in detail in FIGS. 5–8. The core-rod assembly 102 consists of a core 11 formed of a soft magnetic material (not a permanent magnet) attached to an end of rod 12 formed of a non-magnetic material.

Referring back to FIG. 1 it can be seen that the assembled linear displacement sensing device 100 consists of the bobbin-coil assembly 105 surrounded by the Hall effect device holder assembly 106 within the housing assembly 110 with the ends of the housing closed by washers 15. The core-rod assembly 102 is disposed for longitudinal movement along the hollow core of the bobbin.

Figure 22:
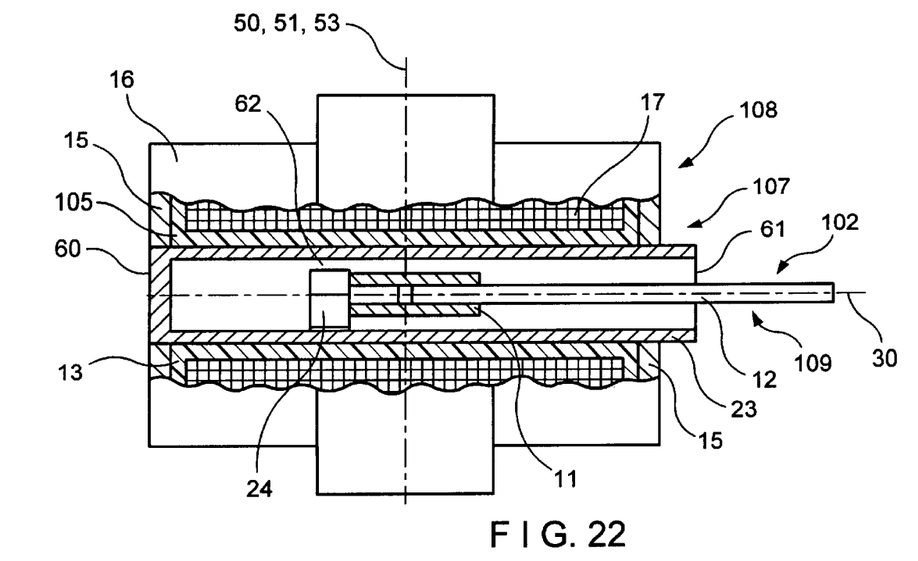
FIG. 22 is a schematic sectional view of a second embodiment of a displacement sensor in accordance with the present invention.
Figures 23, 24:
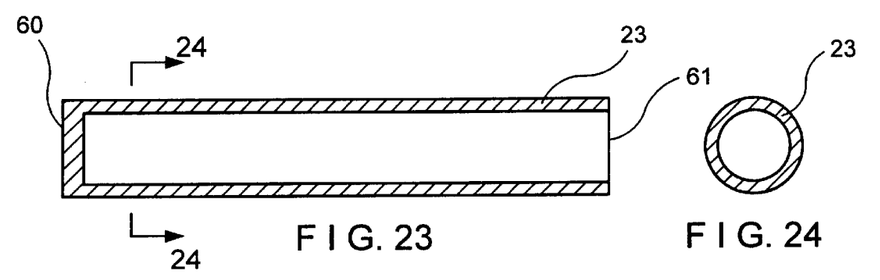
FIG. 23 is a side sectional view of an isolation tube used in the embodiment of FIG. 22.
FIG. 24 is a sectional view taken along reference lines 24—24 of FIG. 23.

Reference is now made to FIG. 22 wherein a second embodiment 107 of a sensor in accordance with the present invention is depicted. The basic components of sensor 107 are the same as those of sensor 100 and hence bear the same reference numerals and no further explanation is required. The differences are in the construction of the electrical sensing assembly 108 and the core-rod assembly 109. Accordingly, as shown in FIG. 22, an isolation tube 23 is provided in the center of the bobbin 13, firmly attached to the internal surfaces of the hollow bobbin. The isolation tube 23 (shown in detail in FIGS. 23 and 24) has a closed end 60 which substantially coincides with the flat sides to close one end washer 15 and an open end 61 which extends through the opposite end washer 15.

Figure 25:
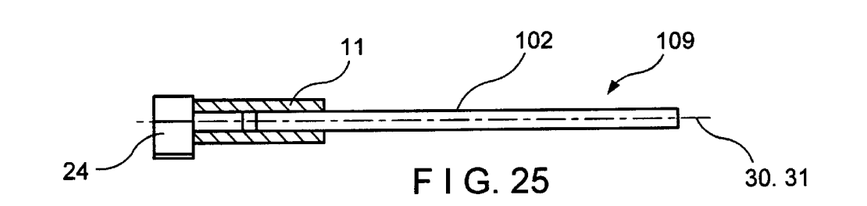
FIG. 25 is a sectional view of the core-rod assembly used in the embodiment of FIG. 22.
Figure 26:
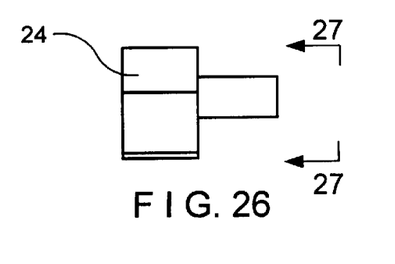
FIG. 26 is a side view of the centering plunger of the core-rod assembly.
Figure 27:
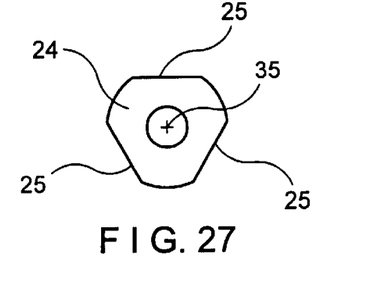
FIG. 27 is an end view taken along reference lines 27—27 of FIG. 26.

The core-rod assembly 109 (depicted in FIGS. 25–27) consists of core-rod 102 and core 11 which are the same as the corresponding elements of the first embodiment along with a centering plunger 24 attached to the end of the core-rod 102 so that the axis 37 of the core and axis 35 of the centering plunger substantially coincide. The centering plunger 24 consists of a disk having the same outside diameter as the inside diameter of isolation tube 23. However, three flats 25 are cut away from the plunger. When the core-rod assembly 109 is positioned within the isolation tube 23, the flats serve to provide passageways 62 to allow back-flow of fluid or gas within the isolation tube as the core-rod is axially displaced into the isolation tube 23 (in the direction of arrow 30).

The core 11 is machined generally of a metal tube made of magnetic material that is heat treated to improve its magnetic properties. A hard metal coating is applied to its periphery. The rod 12 is machined of a non-magnetic material. The core 11 is attached at one end of the rod 12. The bobbin 13 is made of a non-magnetic material. The coil 17 which is formed of an electrically conductive, insulated wire is wound about the bobbin. The Hall effect devices 19, 20, 21 and 22 are assembled into holder 18 while adjusting the axial position of the Hall effect devices so that the axis 50 of each of the devices falls onto the same flat plane 54 as discussed above with regard to FIG. 18. The Hall effect devices are firmly attached to holder 18. The bobbin-winding assembly 105 is firmly attached within the Hall effect device assembly 106 and these assemblies are firmly attached win the housing 16. The core-rod assembly 102 is disposed for movement within the housing. The performance of sensors 100 and 107 are substantially the same and the assembly of sensor 107 is substantially the same as that described above except that the isolation tube 23 is insert into the bobbin and the core-rod assembly 109 is inserted into the isolation tube.

Figure 28A:
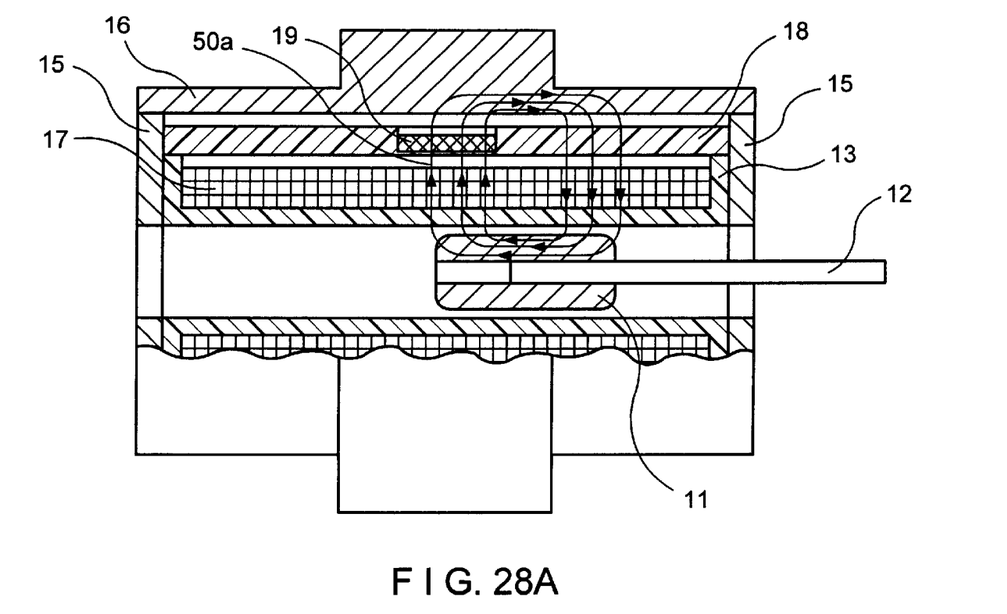
FIGS. 28A, 28B and 28C are fragmentary side sectional views of the displacement sensor in accordance with the present invention depicting the magnetic flux flow for three different axial positions of the core-rod.
Figure 28B:
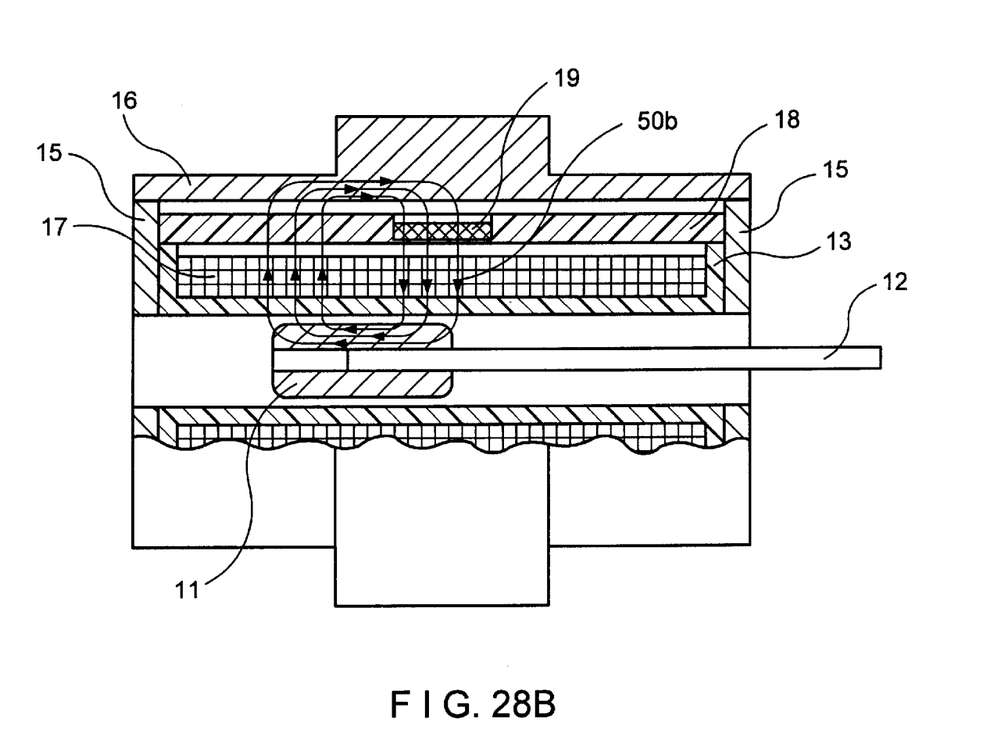
Figure 28C:
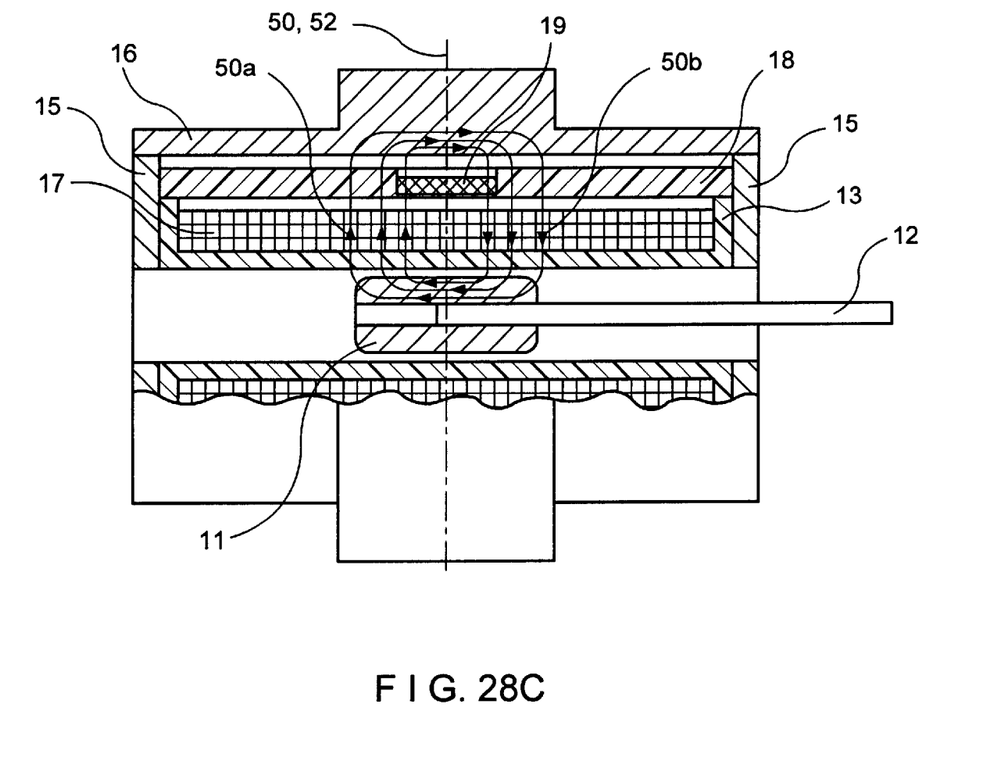

FIGS. 28A, 28B and 28C illustrate the magnetic flux path that results from the DC excitation of coil 17 as the core is longitudinally displaced. The magnetic flux flows from the core 11, through the Hall effect device (only device 19 is depicted), to magnetic shell 16 and back to core 11. When the core least penetrates the bobbin (shown in FIG. 28A) the magnetic flux flowing through the Hall effect device 19 is defined as positive direction flux and the output voltage polarity generated by the Hall effect device is positive. Upon continuing displacement of the core into the bobbin to the opposite side of the Hall effect device (shown in FIG. 28B) the direction of magnetic flux flowing through the Hall effect device 19 reverses to what maybe defined as negative direction flux flow and the electrical output voltage polarity generated by Hall effect device 19 is negative. When the line of axial symmetry 52 of core 11 and the Hall effect device lateral axis of symmetry coincide (as shown in FIG. 28C) the amount of magnetic flux flowing through the Hall effect device 19 in the positive direction is the same as that flowing through the Hall effect device 19 in the negative direction. The electrical output of the Hall effect device 19 will be zero in this null position.

Figure 29A:
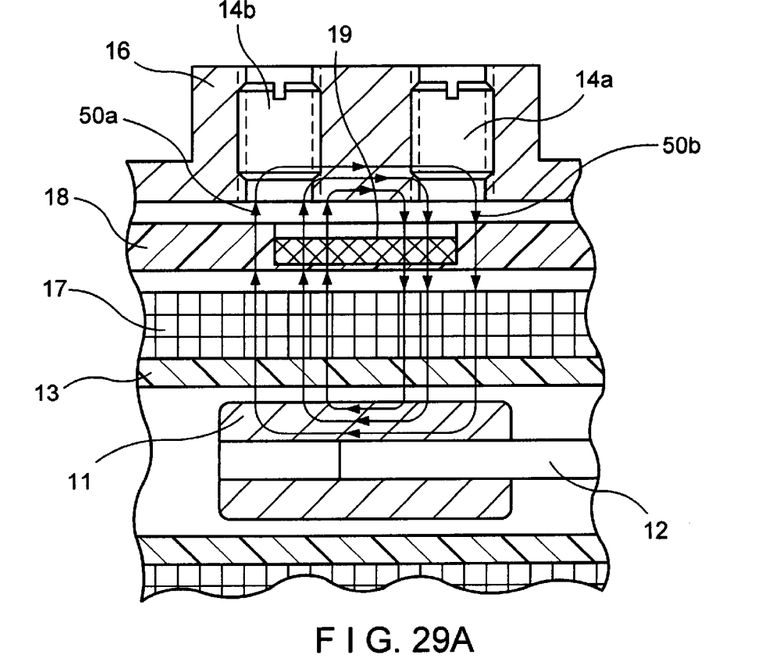
FIGS. 29A and 29B are fragmentary side sectional views of the displacement sensor depicting different settings for the axial distribution of magnetic flux.
Figure 29B:
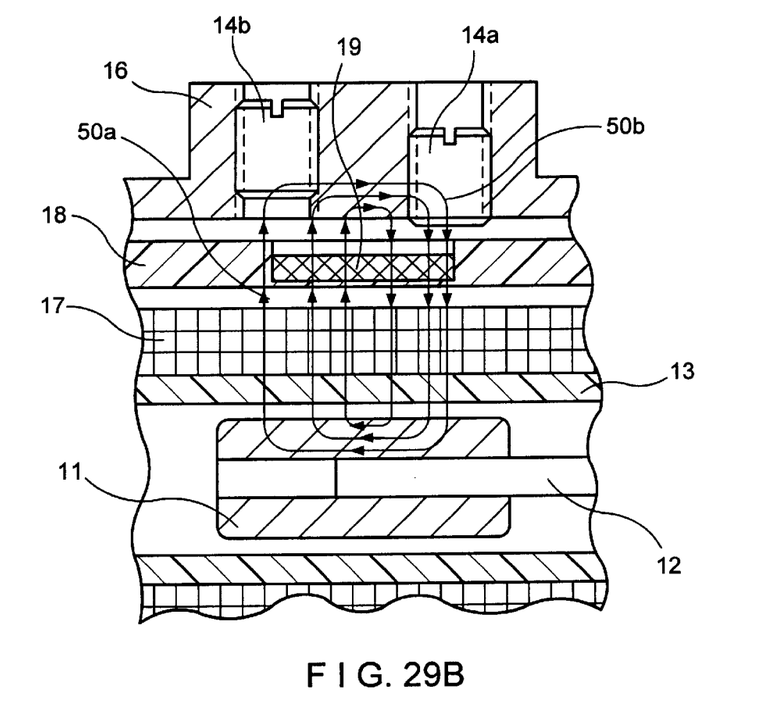

FIGS. 29A and 29B illustrate the manner in which the null position may be adjusted. With the core 11 in the null position described above the magnetic screws 14a and 14b are fully retracted (as shown in FIG. 29A) and do not effect the magnetic flux configuration. By adjusting the position of magnetic screw 14a to further penetrate the housing, the amount of negative magnetic flux (as defined above) is increased. The increased negative flux can be balanced by shifting the core position thereby shifting the null point for Hall effect device 19. Similar adjustments can be made for the screws associated with the other Hall effect devices 20, 21 and 22. This option allows the user of the sensor to adjust and bring four null positions to one position of the core-rod assembly. The adjustment may be made after final installation of the sensor within an associated control system.

Figures 30, 31:
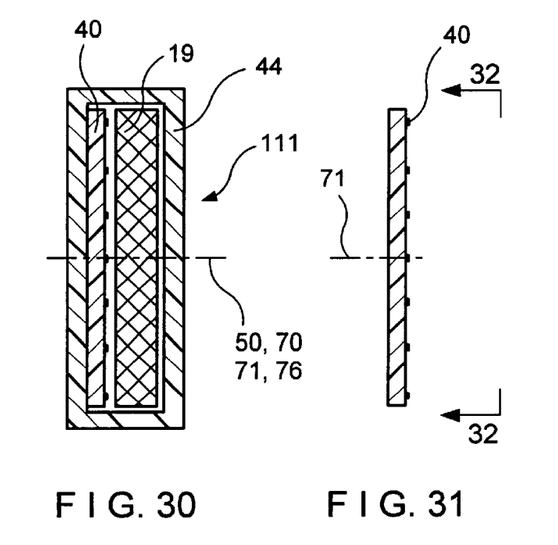
FIG. 30 is a schematic side sectional view of a proximity sensor.
FIG. 31 is a side view of the coil of the sensor of FIG. 30.
Figure 32:
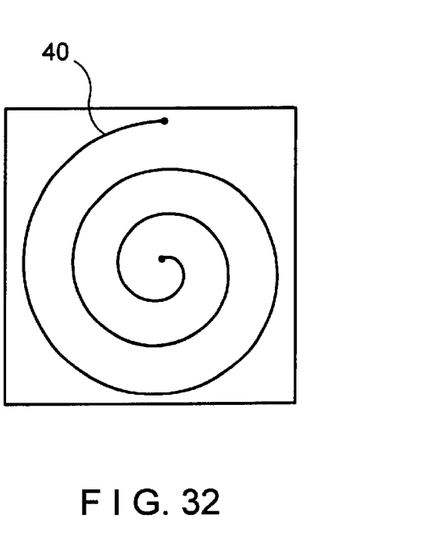
FIG. 32 is a plan view of the coil of FIG. 31 taken in the direction of the arrows 32—32.
Figure 33:
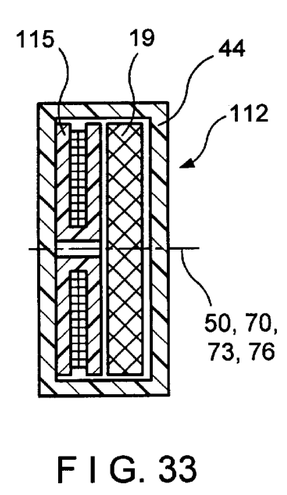
FIG. 33 is a schematic side sectional view of a second proximity sensor.
Figures 34, 35:
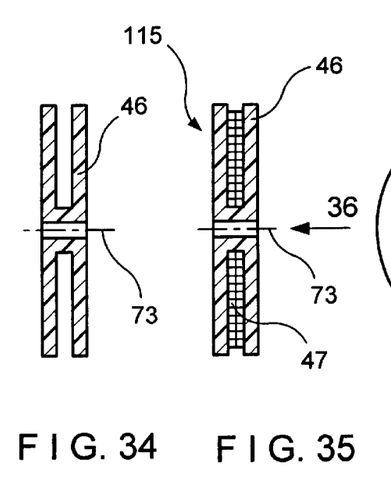
FIG. 34 is a side elevational view of the bobbin of the sensor of FIG. 33.
FIG. 35 is a side elevational view of the bobbin of the sensor of FIG. 33 with the coil in position.
Figure 36:
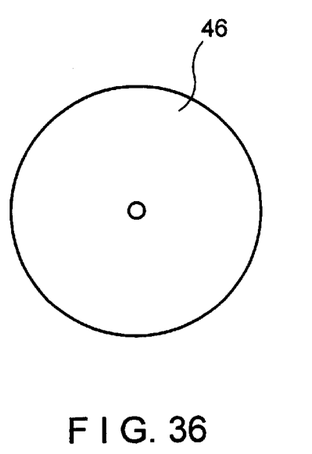
FIG. 36 is a plan view taken in the direction of the arrows 36—36 of FIG. 35.

In FIGS. 30–31 a first plain proximity sensor 111 is depicted comprised of a spiral shaped coil 40, Hall effect device 19 and housing 44. The Hall effect device 19 line of lateral symmetry 50, the axis 70 of housing 44, axis 71 of spiral coil 40 and axis 76 of sensor sensitivity coincide as shown. The spiral coil may, for example, be produced utilizing metal deposit techniques. When the coil is electrically energized magnetic flux will flow. Some of the flux will flow through the Hall effect device 19 in the general direction of axis 76. Any displacement of an object of magnetic material toward the Hall effect device 19 in the general direction of axis 76 will cause an increase in the magnitude of the magnetic flux flow flowing through the Hall effect device 19. The magnitude change is indicative of the position of the object.

A second plain proximity sensor 112 is depicted in FIGS. 33–36. The second plain proximity sensor 112 has, in place of the spiral coil of the first plain proximity sensor, a bobbin-coil assembly 115 consisting of a coil wound about a bobbin. The operation of the second plain proximity sensor 112 is the same as that of the first plain proximity sensor and like components of the second plain proximity sensor bear the same reference numerals as those of the first plain proximity sensor.

Figures 37, 38:
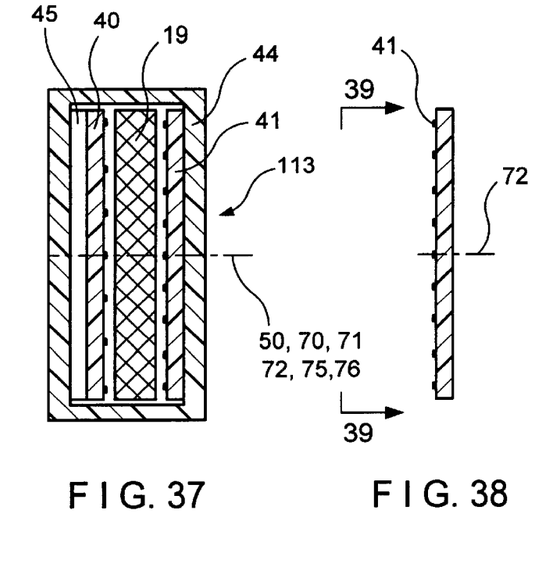
FIG. 37 is a schematic side sectional view of a first compound proximity sensor.
FIG. 38 is a side view of the coil of the sensor of FIG. 37.
Figure 39:
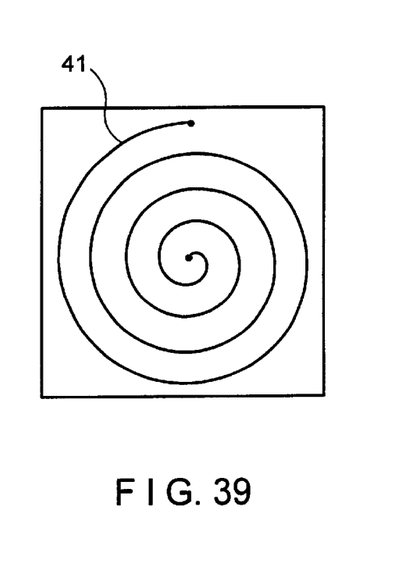
FIG. 39 is a plan view taken in the direction of the arrows 39—39 of FIG. 38.

In FIGS. 37–39 a first compound proximity sensor 113 is depicted. The compound proximity sensor 113 consists of first and second spiral coils 40, 41 on opposite sides of the Hall effect device 19. Magnetic material disk 45 backs spiral coil 40 and is firmly attached to it. In operation the spiral shaped coils 40, 41 are connected in series or parallel opposition so that when the coils are energized the magnetic flux flows generated by the coils will flow in opposite directions through the Hall effect device 19. The number of turns of coil 41 is higher than the number of tuns of coil 40. Since coil 40 is firmly attached to magnetic material disk 45, the magnetic flux generated by coil 40 will be higher than the magnetic flux generated by coil 41. Displacement of an object of magnetic material toward the second coil 41 in the general direction of axis 76 will cause an increase in the magnitude of flux flow generated by the second coil 41. Since the number of turns of the second coil 41 is higher than the number of turns of the first coil 40, the flux flowing through the Hall effect device 19 in totality will reverse direction and the output signal of the Hall effect device 19 will reverse.

In FIGS. 40–43 a second compound proximity sensor 114 is depicted. The construction of the second compound proximity sensor 114 is the same as that of the first compound proximity sensor except that bobbin-coil assemblies 115, 116 are used in place of the first and second spiral coils 40, 41. The bobbins 46 about which the coils are wound are formed on non-magnetic material and the number of turns of coil 47 is smaller than the number of turns of coil 48.

Thus, in accordance with the above the aforementioned objectives are effectively attained. In each of the above described embodiments the excitation voltage of the coils is DC as is the output voltage.

What is claimed is:

1. A displacement measuring sensor comprising:
   an elongated bobbin of non-magnetic material disposed within a housing, said bobbin having a hollow hub;
   a coil of insulated, electrically conductive wire disposed about said bobbin;
   at least one Hall effect device disposed about said coil; and
   an elongated core of magnetic material disposed for movement within said hollow hub.

2. The displacement measuring sensor of claim 1 further comprising a housing formed of a magnetic material containing said bobbin, coil, Hall effect device and core.

3. The displacement measuring sensor of claim 1 further comprising a tube within said hollow hub, said tube having a closed end and an open end.

4. The displacement measuring sensor of claim 3 wherein said housing is formed of a magnetic material containing said bobbin, tube, coil, Hall effect device and core.

5. The displacement measuring sensor of claim 3 wherein said core is positioned within said tube.

6. The displacement measuring sensor of claim 1 further comprising a plurality of Hall effect devices disposed about said coil.

7. A proximity indicating sensor comprising:
   a first spiral electrical energizing coil;
   a Hall effect device disposed adjacent said first coil, said Hall effect device having a lateral axis of symmetry which substantially coincides with an axis of said coil and said Hall effect device direction of magnetic sensitivity; and
   a second spiral electrical energizing coil disposed adjacent said Hall effect device on a side of said Hall effect device opposite to said first spiral electrical energizing coil, said second spiral electrical energizing coil having an axis substantially coincident with the axis of said first spiral electrical energizing coil.

8. The proximity indicating sensor in accordance with claim 7 further comprising a disk of magnetic material adjacent to one of said coils opposite to said Hall effect device.

9. The proximity indicating sensor in accordance with claim 8 wherein the windings of said first and second coils are connected in opposition.

10. A position indicating sensor comprising:

a housing;

a disk of magnetic material;

a first coil disposed adjacent said disk;

a Hall effect device disposed adjacent said coil, said Hall effect device having an axis of lateral symmetry that substantially coincides with a direction of magnetic sensitivity of said Hall effect device;

a second coil disposed adjacent said Hall effect device on a side opposite to that of said first coil; said first coil and said second coil being connected to one another in opposition; and said first and second coils having axes that substantially coincide with each other and with an axis of said disk and said axis of lateral symmetry.

11. The position indicating sensor of claim 10 wherein the number of turns of said second coil is higher than the number of turns of said first coil.

* * * * *